(12) United States Patent
Yamamoto et al.

(10) Patent No.: US 7,630,644 B2
(45) Date of Patent: Dec. 8, 2009

(54) OPTICAL ADD/DROP MULTIPLEXER, CONTROL METHOD THEREFOR AND CONTROL PROGRAM THEREFOR

(75) Inventors: Akira Yamamoto, Fukuoka (JP); Haruki Tanaka, Fukuoka (JP); Tatsuo Nagayoshi, Fukuoka (JP); Tomoyuki Sakata, Fukuoka (JP); Taro Asao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 481 days.

(21) Appl. No.: 11/378,288

(22) Filed: Mar. 20, 2006

(65) Prior Publication Data

US 2007/0133992 A1 Jun. 14, 2007

(30) Foreign Application Priority Data

Dec. 14, 2005 (JP) ............................. 2005-361039

(51) Int. Cl.
*H04J 14/02* (2006.01)
(52) U.S. Cl. ............................. 398/83; 398/91; 398/94
(58) Field of Classification Search .................. 398/83, 398/91, 93–95
See application file for complete search history.

(56) References Cited

U.S. PATENT DOCUMENTS 7,280,761 B2 * 10/2007 Aono .......................... 398/94

2002/0051271 A1 * 5/2002 Yoshikoshi .................. 359/189
2006/0072918 A1 * 4/2006 Gerstel et al. ................. 398/83
2006/0104641 A1 * 5/2006 Casanova et al. ............. 398/83

FOREIGN PATENT DOCUMENTS

JP 2002-204209 7/2002
JP 2003-69496 3/2003

* cited by examiner

*Primary Examiner*—Dzung D Tran
(74) *Attorney, Agent, or Firm*—Westerman, Hattori, Daniels & Adrian, LLP

(57) ABSTRACT

The present invention provides an optical add/drop multiplexer including an optical power control unit for performing a control of an optical power by the unit of each signal light included in the wavelength multiplexed light, wherein the optical power control unit includes control logic for implementing a first control mode in which a transition to an automatic control of the optical power and release from the aforementioned control are carried out by comparing the optical power with a threshold value, and a second control mode in which a transition to an automatic control of the optical power is carried out based on control information of a notification by another of the optical add/drop multiplexers and release from the automatic control is carried out based on the comparison between the optical power and the threshold value.

13 Claims, 11 Drawing Sheets

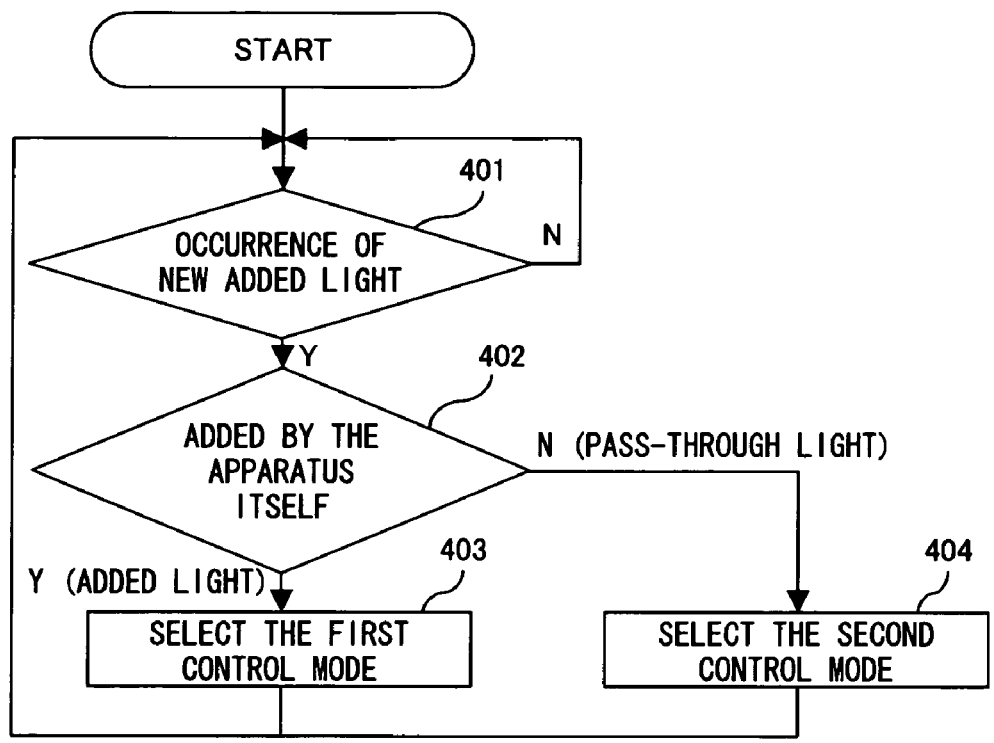
F I G. 1

|  | $\lambda_1$ | $\lambda_2$ | $\lambda_3$ | $\lambda_n$ |
|---|---|---|---|---|
| CHANNEL ATTRIBUTE | A | T | T | T |
| CONTROL STATUS | ALD | Block | Shutdown | ALC |
| WAVELENGTH CONFIGURATION SIGNAL (WCS) | 1 | 0 | 1 | 1 |
| WAVELENGTH CHANNEL FAILURE (WCF) | 1 | 1 | 1 | 0 |
| SHUTDOWN CONTROL INFORMATION | release | set | set | release |
| . | . | . | . | . |
| . | . | . | . | . |
| . | . | . | . | . |
| . | . | . | . | . |
| . | . | . | . | . |
| . | . | . | . | . |

F I G. 6

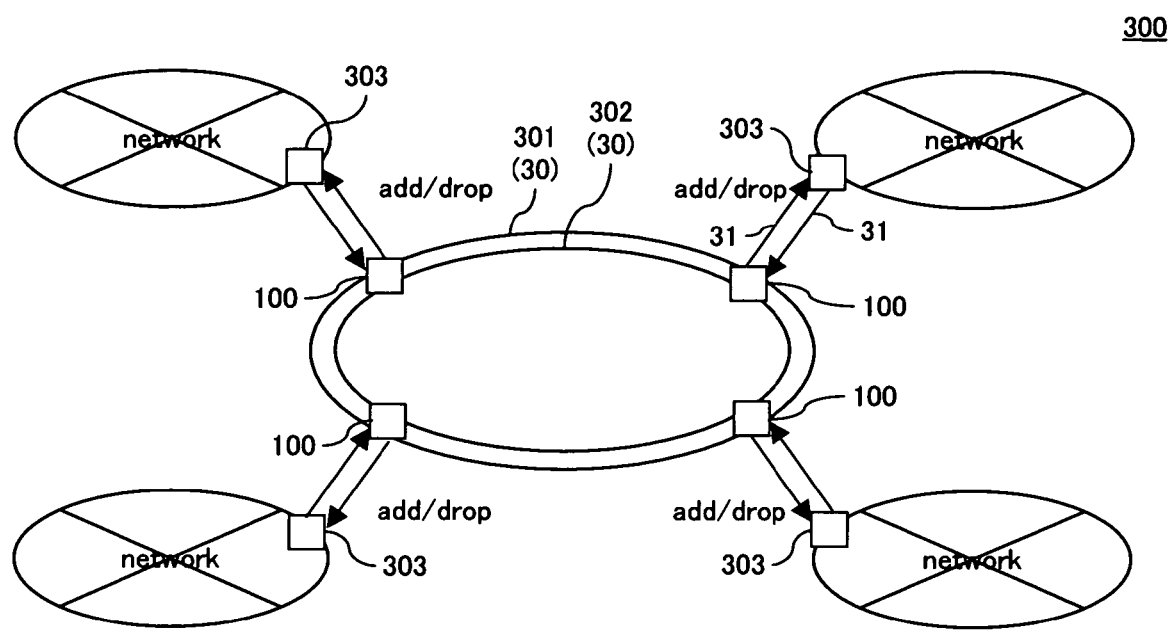
F I G. 7

OPTICAL ADD/DROP MULTIPLEXER, CONTROL METHOD THEREFOR AND CONTROL PROGRAM THEREFOR

BACKGROUND OF THE INVENTION

1. Field of the Invention

The present invention relates to an optical add/drop multiplexing technique and its control program, and to a technique effectively applicable to an optical add/drop multiplexer and its control technique constituting an optical network that utilizes a wavelength division multiplexing (WDM) for example.

2. Description of the Related Art

In recent years, in proportion to the expansion of telecommunications capacity and range, the large capacity and long distance capabilities of a network have become increasingly in demand. An optical network utilizing a wavelength division multiplexing (WDM) has conventionally been used as a backbone network in order to satisfy such demands.

An optical network utilizing the WDM uses an optical add/drop multiplexer (OADM) for adding a discretionary wavelength to a discretionary path, and dropping and receiving a signal light of the discretionary wavelength from the discretionary path in order to meet a requirement of telecommunication between cities.

The WDM usually uses an optical amplifier such as an EDFA (Erbium-Doped Fiber Amplifier), et cetera, for amplifying a wavelength range including wavelengths of a plurality of signal lights. Such an optical amplification generates an ASE (amplified spontaneous emission) noise and therefore a countermeasure against a failure caused by an accumulation of ASE noise is necessary in the case of using a plurality of OADMs by connecting them in multiple stages.

For instance, a patent document 1 has disclosed a technique for attempting to remove an ASE noise, excluding signal lights, by placing an optical filter synchronously with each signal light in an optical path for each signal light between an optical drop filter and an optical multiplexer in an OADM.

And the patent document 1 has also disclosed a technique for attempting to maximize each signal light level by placing an optical monitor for detecting an optical power of each signal light in the optical path of an optical multiplexer on its output side and feeding back information of the observed optical power to an optical filter control unit.

A patent document 2 has disclosed a technique for attempting to prevent a cumulative increase of an ASE noise by using different free spectral ranges between an optical branching filter and an optical multiplexer in an OADM.

However, neither of the above noted patent documents 1 nor 2 recognizes the technical problems at the time of adding a signal light as follows.

That is, the WDM requires a control of an intensity of each signal light of a plurality of optical wavelength signals which are set at a predetermined frequency interval so as to identify with a target level and a control for adjusting an inserted signal light to the target level in the case of adding a new signal light.

Accordingly a conceived method is to make each OADM carry out the control for maintaining a standby state until the inserted light reaches a first threshold level value, transitioning to an automatic control state of a signal level when exceeding the first threshold level value and transitioning to a standby state if the signal level becomes lower than a second threshold level value that is higher than the first threshold level value in the automatic control state.

A normal control of a target level in the automatic control state is carried out by adjusting an attenuation degree of an optical attenuator installed in the optical path of each signal light.

The ASE noise, however, is made to shift so as to increase an overall signal level across almost the whole range of a wavelength multiplexed light, and therefore the ASE noise may be accumulated while passing-through a plurality of OADMs, which are connected in multiple stages, and may exceed the above described first threshold level value since a signal level in an unused wavelength band as the subject of insertion may have increased.

Consequently, if a transition between the above noted standby and automatic control states is controlled by a detection of a signal level in a plurality of OADMs which are connected in multiple stages, an OADM which is positioned as a subsequent stage of an OADM that adds a signal light and makes the signal light pass through assumes a state of transitioning to an automatic control state if a level of a signal light of the incoming inserted wavelength band exceeds the first threshold level value due to an ASE noise.

And, since the ASE noise level in this event is lower than the target level, the control system in the automatic control state assumes a state of waiting with the degree of attenuation of the attenuator at the minimum in order to make the ASE noise level reach the target level.

Then, when carrying out a signal light insertion, by connecting an optical fiber of an OADM of the previous stage, to the OADM which is in the automatic control state, there is a technical problem of a power level of the inserted signal light in the OADM on a pass-through side exceeding the target level, because the degree of attenuation is at the minimum, thus bringing about a data error such as crosstalk by disturbing a signal level of other signal lights of the adjacent wavelengths.

In order to avoid such a technical problem, a possible approach is to avoid an accumulation of the ASE noise by limiting the number of connecting stages of the OADM this results, however, in the technical problem of limiting a telecommunication range of a telecommunication system using the OADMs.

[Patent document 1] Laid-open Japanese Patent Application Publication No. 2002-204209

[Patent document 2] Laid-open Japanese Patent Application Publication No. 2003-69496

SUMMARY OF THE INVENTION

A purpose of the present invention is to provide a technique enabling definite prevention of a data failure due to an ASE noise, et cetera, at the time of a wavelength insertion without an associated cost increase of an additional component in an optical telecommunication system including a plurality of optical add/drop multiplexers.

Another purpose of the present invention is to provide a technique enabling an implementation of long distance telecommunication by a multiple stage connection of a discretionary number of optical add/drop multiplexers without causing a limitation in the number of connecting stages thereof in an optical telecommunication system including a plurality of optical add/drop multiplexers.

Yet another purpose of the present invention is to provide a technique of enabling a removal, in the units of wavelength, of a multiple stage accumulation of ASE noise generated by optical amplifiers in an optical telecommunication system including a plurality of optical add/drop multiplexers.

A first aspect of the present invention is to provide an optical add/drop multiplexer including: an optical switch unit for performing an optical add/drop multiplexing for a wavelength multiplexed light; an optical power control unit for performing a control of an optical power by the unit of each signal light included in the wavelength multiplexed light; and a control information communication unit for transmitting and receiving control information with another apparatus, wherein the optical power control unit includes control logic for implementing a first control mode in which a transition to an automatic control of the optical power and release therefrom are carried out by comparing the optical power with a threshold value, and a second control mode in which a transition to an automatic control of the optical power is carried out based on the control information notification provided by another of the optical add/drop multiplexers by way of the control information communication unit and release from the automatic control is carried out based on the comparison between the optical power and the threshold value.

A second aspect of the present invention is to provide the optical add/drop multiplexer according to the first aspect, wherein the first control mode is used if the inserted light is the light inserted by the apparatus itself, and the second control mode is used if the signal light is a pass-through light originating externally.

A third aspect of the present invention is to provide the optical add/drop multiplexer according to the first aspect, wherein the first control mode includes a block state at the time of turning power on, a shutdown state at the time of recognizing a usage start of the inserted light, an auto level down state for the purpose of judging whether or not to transition to automatic control of an optical power of the inserted light, and an automatic level control state for making an optical power of the inserted light identify with a target level by the automatic control, wherein a transition from the shutdown state to the auto level down state and a reversion of the aforementioned transition are carried out by an instruction for releasing a shutdown and setting a shutdown, both originating externally, and a transition from the auto level down state to the automatic level control state and a reversion of the aforementioned transition are carried out based on whether or not an optical power of the inserted light exceeds a first threshold value and whether or not the optical power becomes lower than a second threshold value.

A fourth aspect of the present invention is to provide the optical add/drop multiplexer according to the first aspect, wherein the second control mode includes a block state at the time of turning a power on, a shutdown state at the time of recognizing a usage start of the pass-through light, and an automatic level control state for making an optical power of the pass-through light identify with a target level by an automatic control, wherein a transition from the shutdown state to the automatic level control state is carried out based on control information as a notification provided by another of the optical add/drop multiplexers by way of the control information communication unit and release from the automatic level control state is carried out by the comparison between the optical power and a threshold value.

A fifth aspect of the present invention is to provide the optical add/drop multiplexer according to the first aspect, further including an optical attenuation unit for adjusting an optical power of each of the signal lights and an optical power observation unit for detecting an optical power of each of the signal lights, wherein the automatic control is a feedback control for controlling the optical attenuation unit based on the optical power obtained from the optical power observation unit.

A sixth aspect of the present invention is to provide a control method for an optical add/drop multiplexer for carrying out an optical add/drop multiplexing of a signal light for a wavelength multiplexed light, comprising the steps of judging whether the signal light as the subject of control is an inserted light inserted in the apparatus itself or a pass-through light originating externally, and carrying out a first control mode in which a transition to an automatic control of the optical power and release from the aforementioned control are carried out by comparing the optical power with a threshold value, if the signal light is the inserted light, while carrying out a second control mode in which a transition to an automatic control of the optical power of the pass-through light is carried out based on control information as a notification of another of the optical add/drop multiplexers and release from the automatic control is carried out based on the comparison between the optical power and the threshold value.

A seventh aspect of the present invention is to provide the control method for an optical add/drop multiplexer according to the sixth aspect, wherein the first control mode includes a block state at the time of turning a power on, a shutdown state at the time of recognizing a usage start of the inserted light, an auto level down state for the purpose of judging whether or not to transition to automatic control of an optical power of the inserted light, and an automatic level control state for making an optical power of the inserted light identify with a target level by the automatic control, wherein a transition from the shutdown state to the auto level down state and a reversion of the aforementioned transition are carried out by an instruction for releasing a shutdown and setting a shutdown, both provided externally, and a transition from the auto level down state to the automatic level control state and a reversion of the aforementioned transition are carried out by whether or not an optical power of the inserted light exceeds a first threshold value and whether or not the optical power becomes lower than a second threshold value.

An eighth aspect of the present invention is to provide the control method for an optical add/drop multiplexer according to the sixth aspect, wherein the second control mode includes a block state at the time of turning a power on, a shutdown state at the time of recognizing a usage start of the pass-through light, and an automatic level control state for making an optical power of the inserted light identify with a target level by an automatic control, wherein a transition from the shutdown state to the automatic level control state is carried out based on control information as a notification from another of the optical add/drop multiplexers and release from the automatic level control state is carried out by the comparison between the optical power and a threshold value.

A ninth aspect of the present invention is to provide the control method for an optical add/drop multiplexer according to the sixth aspect, wherein an automatic control of the optical power is a feedback control for making an attenuation change based on an observation result of the aforementioned optical power.

A tenth aspect of the present invention is to provide a control program for an optical add/drop multiplexer that carries out an optical add/drop multiplexing of a signal light for a wavelength multiplexed light, making a computer constituting the optical add/drop multiplexer implement the functions of judging whether the signal light as the subject of control is an inserted light inserted by the apparatus or a pass-through light originating externally, carrying out a first control mode in which a transition to an automatic control of the optical power of the signal light and release from the aforementioned control are carried out by comparing the optical power with a threshold value, and carrying out a second control mode in which a transition to an automatic control of the optical power of the signal light is carried out based on control information as a notification by another of the optical add/drop multiplexers by way of the control information communication unit and release from the automatic control is carried out based on the comparison between the optical power and the threshold value.

An eleventh aspect of the present invention is to provide the control program for an optical add/drop multiplexer according to the tenth aspect, wherein the first control mode is carried out if the signal light is an inserted light inserted in the apparatus itself and includes a block state at the time of turning a power on, a shutdown state at the time of recognizing a usage start of the inserted light, an auto level down state for the purpose of judging whether or not to transition to automatic control of an optical power of the inserted light, and an automatic level control state for making an optical power of the inserted light identify with a target level by the automatic control, wherein a transition from the shutdown state to the auto level down state and a reversion of the aforementioned transition are carried out by an instruction for releasing a shutdown and setting a shutdown, both originating externally, and a transition from the auto level down state to the automatic level control state and a reversion of the aforementioned transition are carried out based on whether or not an optical power of the inserted light exceeds a first threshold value and whether or not the optical power becomes lower than a second threshold value.

A twelfth aspect of the present invention is to provide the control program for an optical add/drop multiplexer according to the tenth aspect, wherein the second control mode is carried out if the signal light is a pass-through light originating externally, and includes a block state at the time of turning a power on, a shutdown state at the time of recognizing a usage start of the pass-through light, and an automatic level control state for making an optical power of the inserted light identify with a target level by an automatic control, wherein a transition from the shutdown state to the automatic level control state is carried out based on control information as a notification from another of the optical add/drop multiplexers and release from the automatic level control state is carried out by the comparison between the optical power and a threshold value.

A thirteenth aspect of the present invention is to provide the control program for an optical add/drop multiplexer according to the tenth aspect, wherein the automatic control is a feedback control for controlling an attenuation of the optical power according to an observation result of the aforementioned optical power.

According to the present invention, an optical add/drop multiplexer for instance is enabled to transition to an automatic control state by a feedback control according to an optical power in an add path of an inserted light inserted by the apparatus itself, and is set up for the first control mode for performing a constant control of an output power by automatically transiting to a feedback control in response to an actual operation start of the inserted light.

Meanwhile, another optical add/drop multiplexer at a subsequent stage stands by in a shutdown state which is unaffected by a spurious optical power (i.e., an accumulated ASE noise) in a wavelength band of a pass-through light in a Through Path of the aforementioned pass-through light coming from another optical add/drop multiplexer, and is set up for the second control mode in which the shutdown state transitions to the state for performing a constant control of an output power by a feedback control only if an actual operation of an inserted light (in the case of a wavelength of the inserted light being valid) based on control information as a notification from an optical add/drop multiplexer at a previous stage for indicating a presence or absence of an inserted light.

By this configuration, an automatic control of an optical power in the wavelength band of a pass-through light is not performed until an actual operation start of the aforementioned pass-through light (i.e., an inserted light in an optical add/drop multiplexer on the upstream side) is notified by way of control information of another optical add/drop multiplexer on the downstream side of the optical add/drop multiplexer which has inserted a signal light, thereby suppressing an occurrence of accumulation of an ASE noise in the aforementioned wavelength band.

In other words, a removal of an accumulated ASE noise is enabled among a plurality of optical add/drop multiplexers in the unit of a wavelength band of a signal light.

Accordingly enabled, is a prevention of an automatic transition to a feedback control as a result of an erroneous detection of an output power due to an accumulated ASE noise in a wavelength band of a pass-through light.

As a result of the above, a secure avoidance of an occurrence of a data failure such as in a case of a pass-through light from another apparatus coming in during a standby state of a feedback control, assuming a state of the optical power of the aforementioned pass-through light exceeding a target level and disturbing another signal light in an adjacent wavelength band is enabled.

In other words, it is possible to build up an optical telecommunication system by connecting a discretionary number of stages of optical add/drop multiplexers without being affected by an accumulated ASE noise, hence enabling the long distance telecommunications to be accomplished easily.

Since the first and second control mode can be implemented by software or hardware, a low cost ASE noise countermeasure can be accomplished without changing an existing system or requiring an additional component, et cetera.

BRIEF DESCRIPTION OF THE DRAWINGS

FIG. 1 is a flow chart exemplifying an operation of an optical add/drop multiplexer and a control method therefor according to an embodiment of the present invention;

FIG. 6 is a conceptual diagram exemplifying an information table for use in an optical add/drop multiplexer according to an embodiment of the present invention;

FIG. 7 is a conceptual diagram exemplifying a configuration of a WDM telecommunication system including an optical add/drop multiplexer according to an embodiment of the present invention;

DESCRIPTION OF THE PREFERRED EMBODIMENTS

The following is a detailed description of the preferred embodiment of the present invention in reference to the accompanying drawings.

FIG. 1 is a flow chart exemplifying an operation of an optical add/drop multiplexer and a control method therefor according to the present embodiment.

Figure 2A:
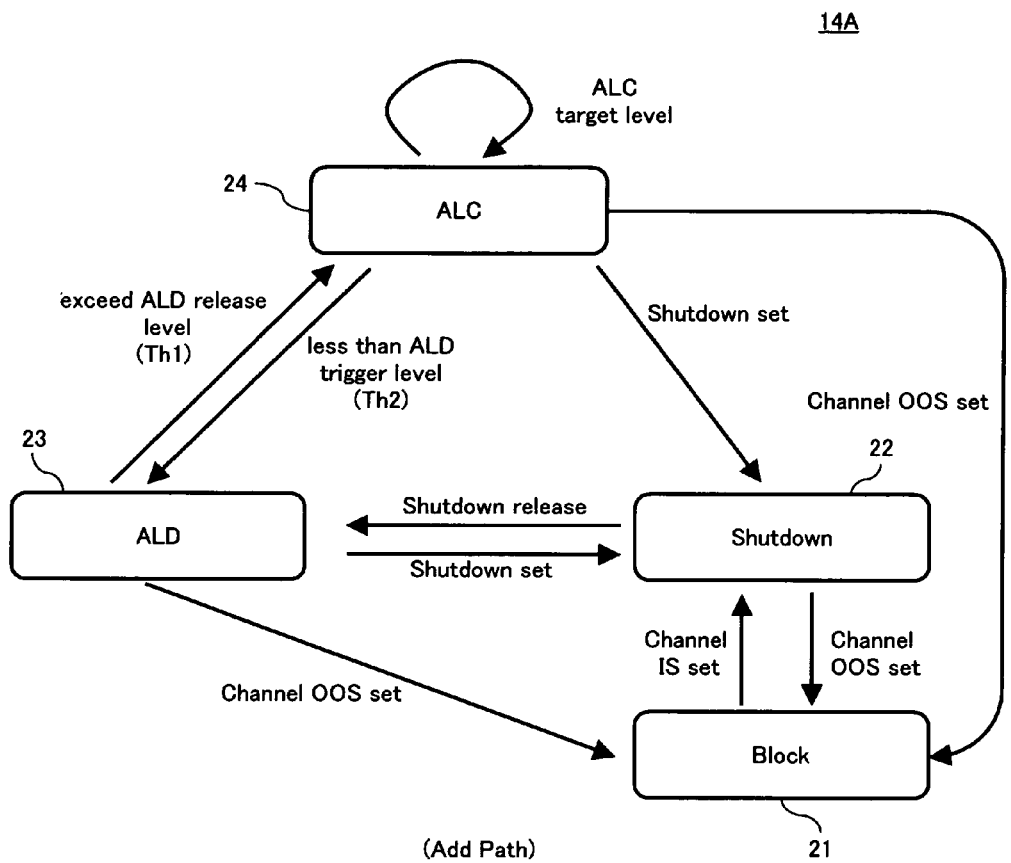
FIG. 2A is a state transition diagram exemplifying an operation of an optical add/drop multiplexer for embodying an optical add/drop multiplexing method according to an embodiment of the present invention.
Figure 2B:
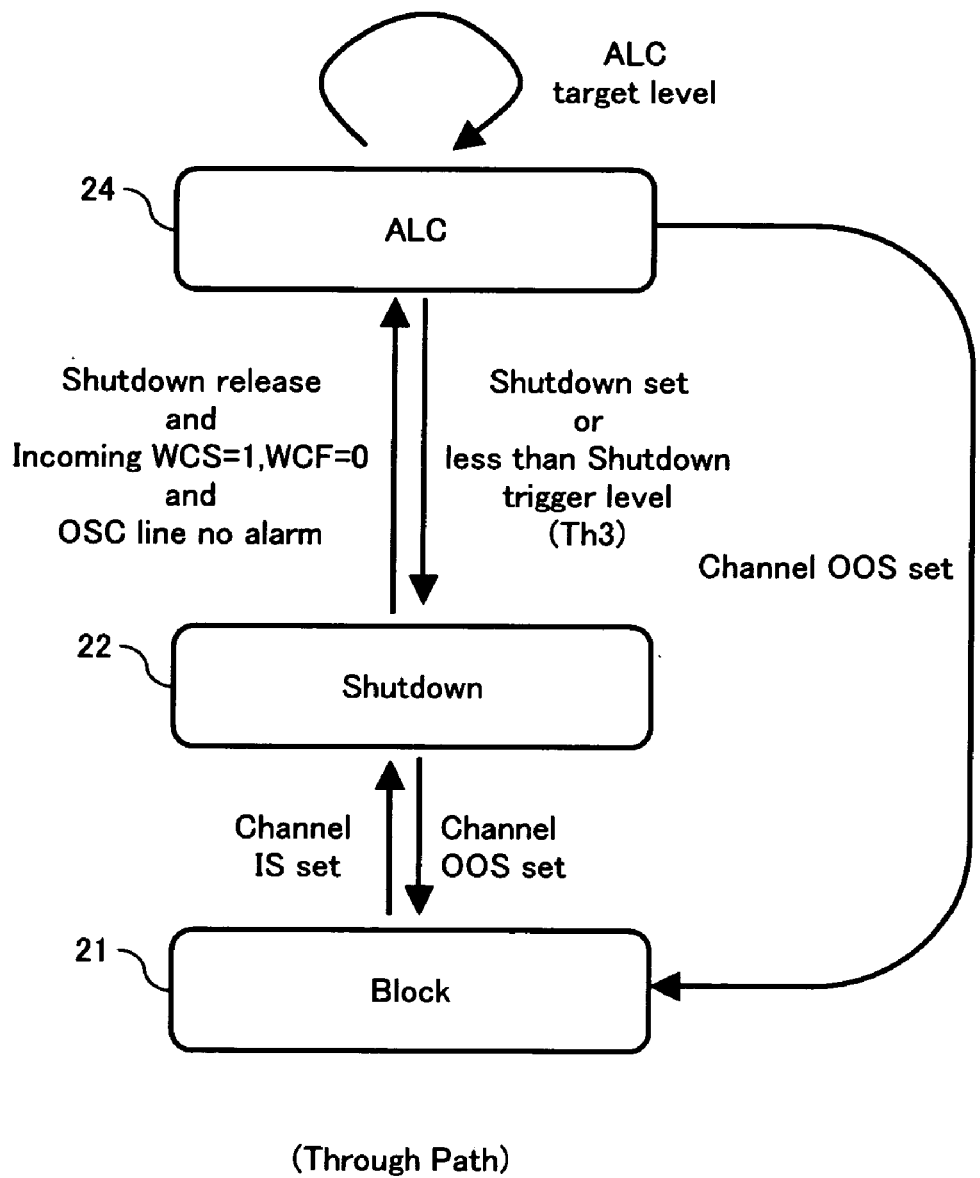
FIG. 2B is a state transition diagram exemplifying an operation of an optical add/drop multiplexer for embodying an optical add/drop multiplexing method according to an embodiment of the present invention.

FIGS. 2A and 2B are state transition diagrams exemplifying an operation of an optical add/drop multiplexer embodying an optical add/drop multiplexing method according to an embodiment of the present invention.

Figure 3:
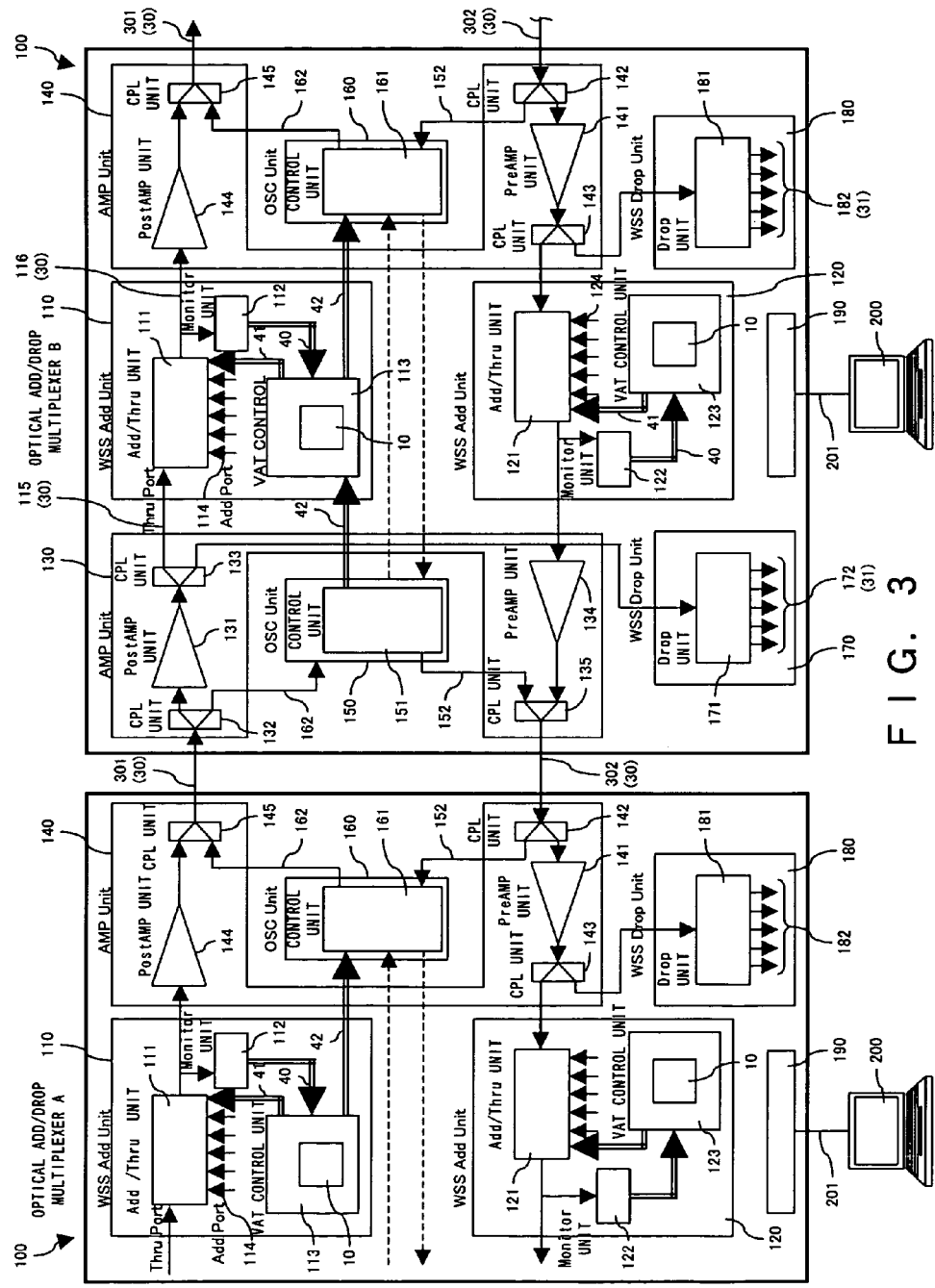
FIG. 3 is a conceptual diagram exemplifying a comprisal of an optical add/drop multiplexer according to an embodiment of the present invention.

FIG. 3 is a conceptual diagram exemplifying a comprisal of an optical add/drop multiplexer according to an embodiment of the present invention.

Figure 4:
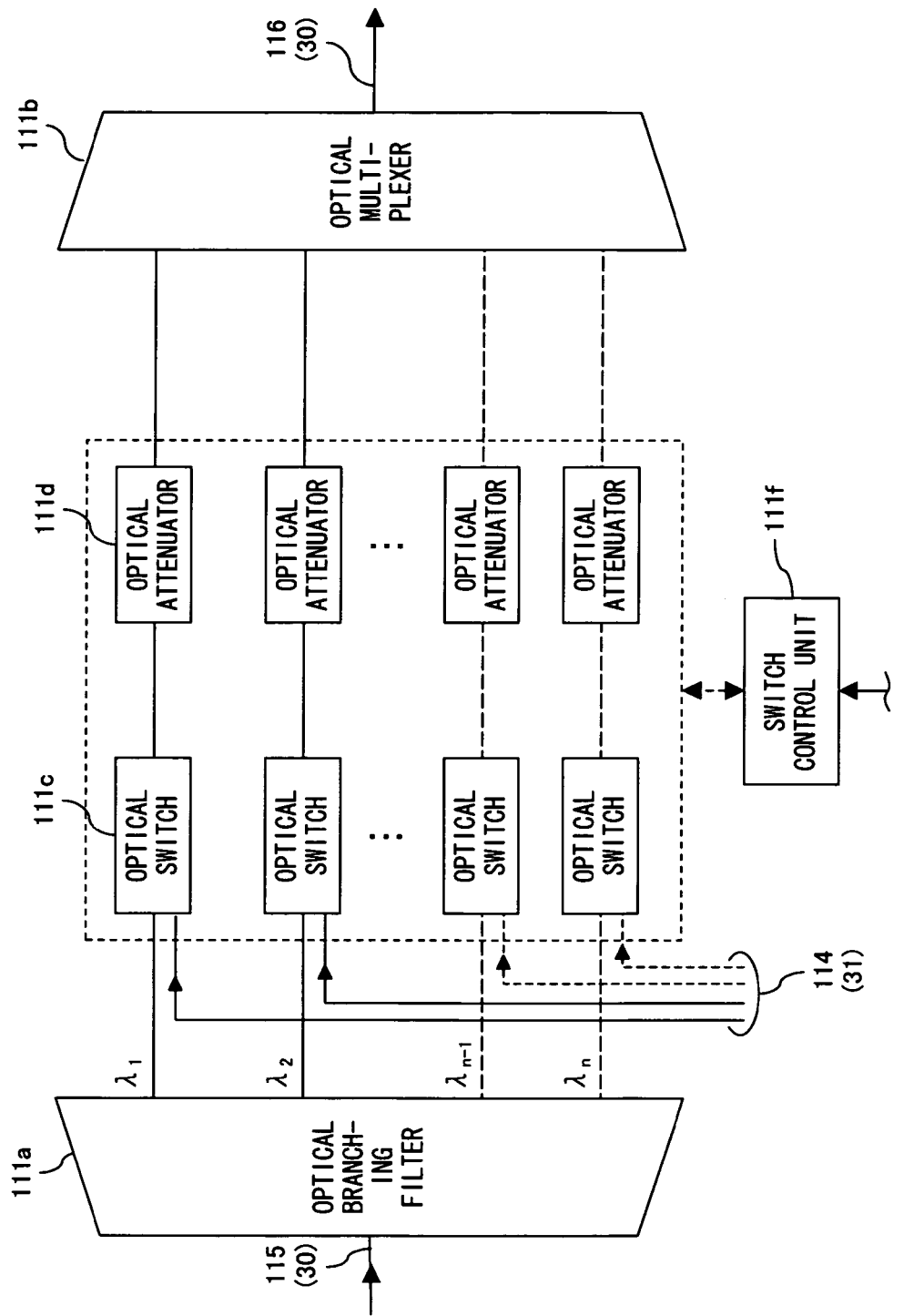
FIG. 4 is a conceptual diagram exemplifying an extracted part of an optical add/drop multiplexer according to an embodiment of the present invention.

FIG. 4 is a conceptual diagram exemplifying an extracted part of an optical add/drop multiplexer according to the present embodiment.

Figure 5:
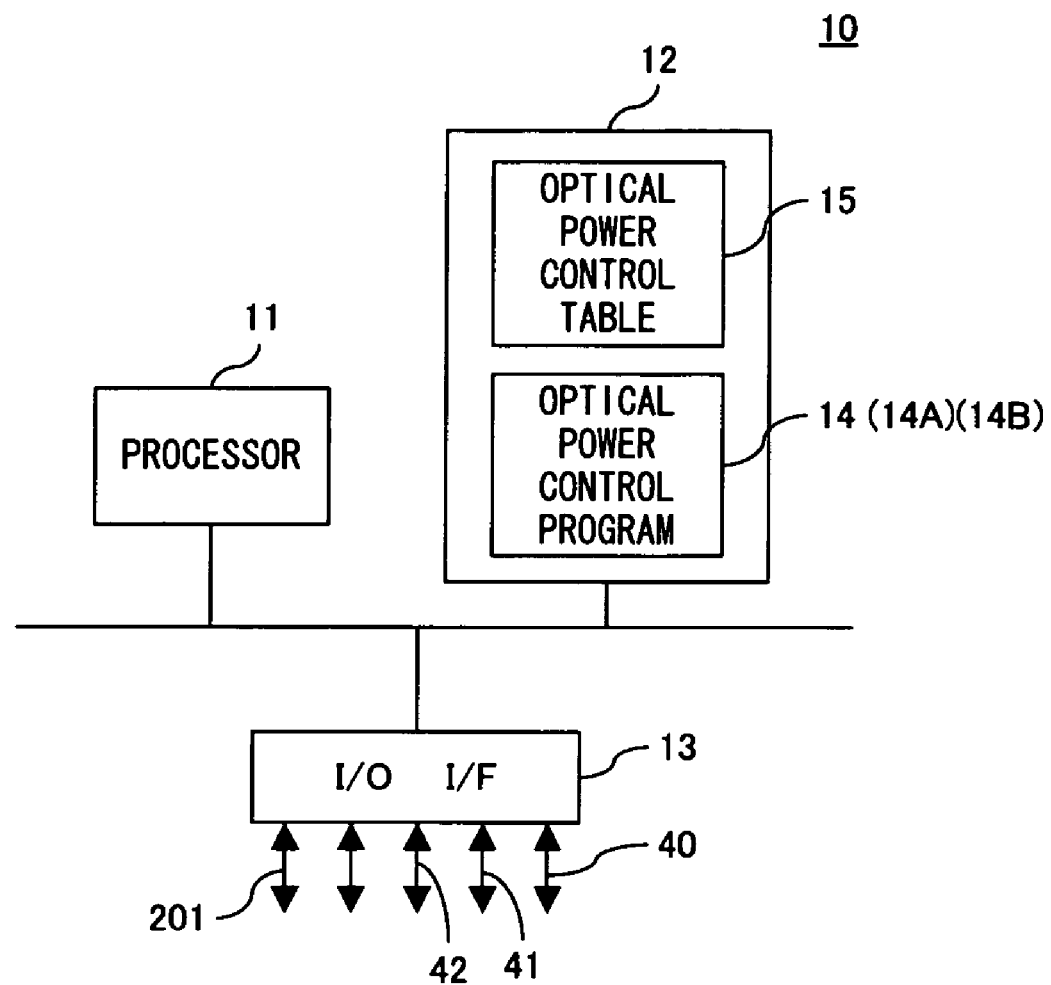
FIG. 5 is a conceptual diagram exemplifying an extracted part of an optical add/drop multiplexer according to an embodiment of the present invention.

FIG. 5 is a conceptual diagram exemplifying an extracted part of an optical add/drop multiplexer according to the present embodiment.

FIG. 6 is a conceptual diagram exemplifying an information table for use in an optical add/drop multiplexer according to the present embodiment.

FIG. 7 is a conceptual diagram exemplifying a configuration of a WDM telecommunication system including an optical add/drop multiplexer according to the present embodiment.

Figure 8:
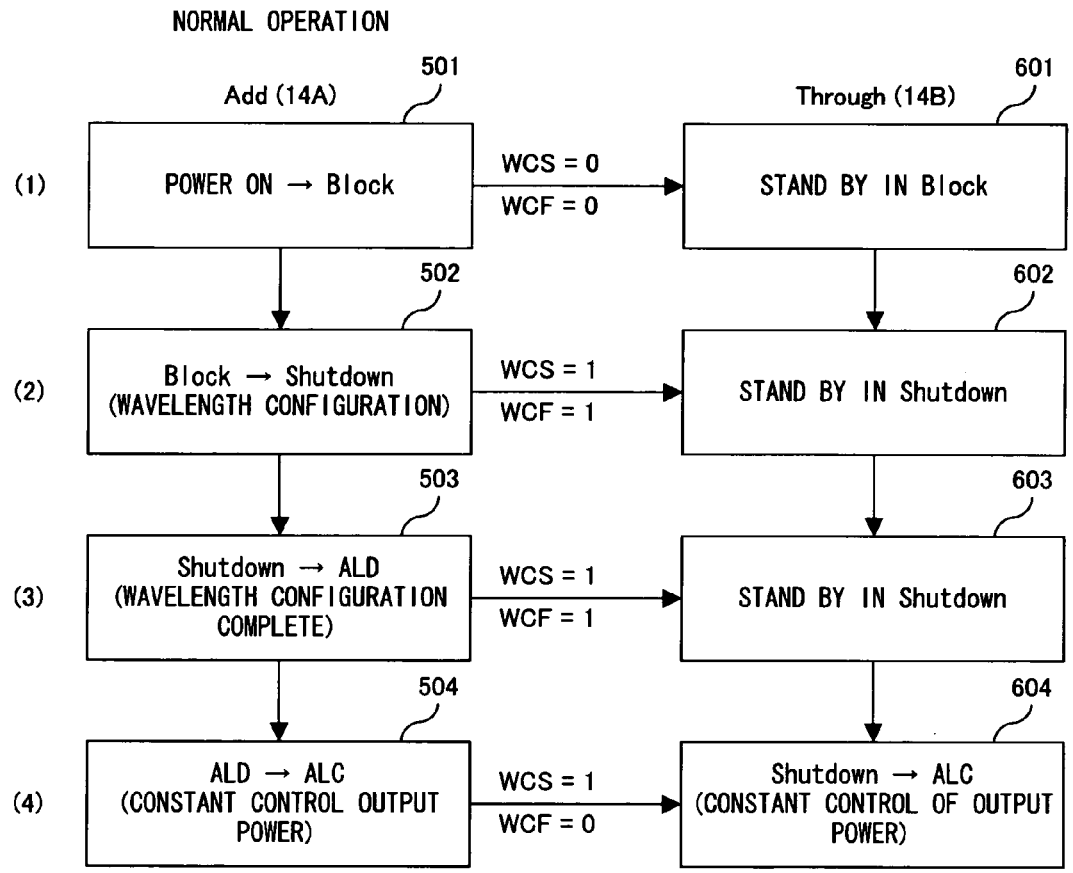
FIG. 8 is a flow chart exemplifying an operation of an optical add/drop multiplexer and a control method therefor according to an embodiment of the present invention.
Figure 9:
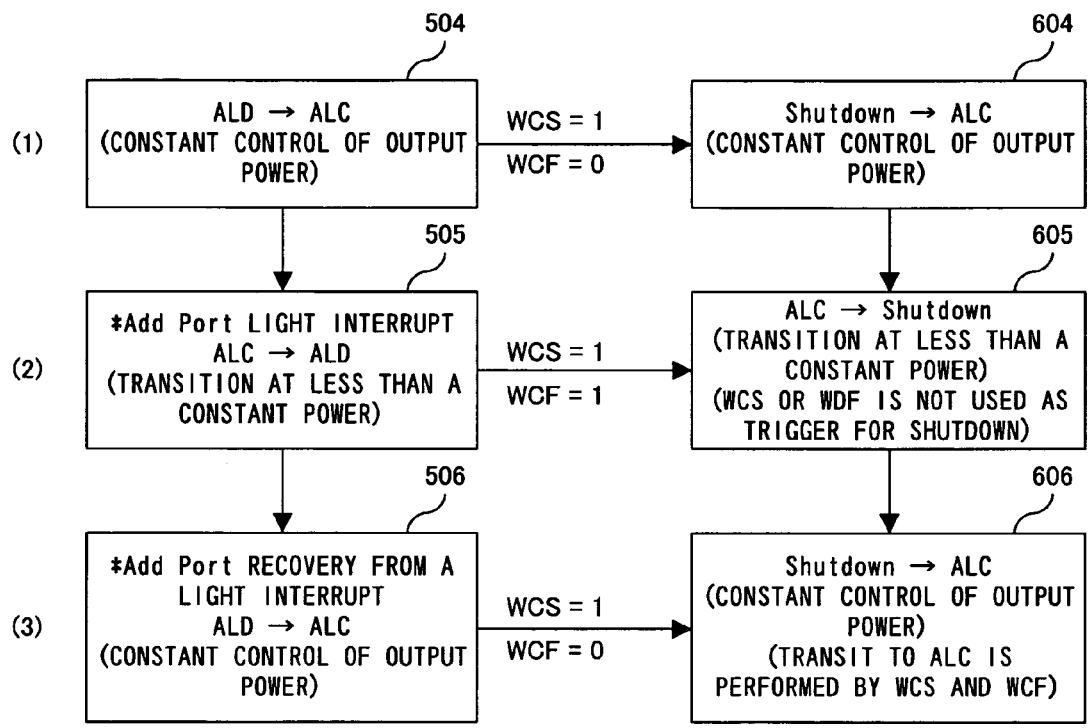
FIG. 9 is a flow chart exemplifying an operation of an optical add/drop multiplexer and a control method therefor according to an embodiment of the present invention.

FIGS. 8 and 9 are each a flowchart exemplifying an operation of an optical add/drop multiplexer and a control method therefor according to the present embodiment.

Figure 10:
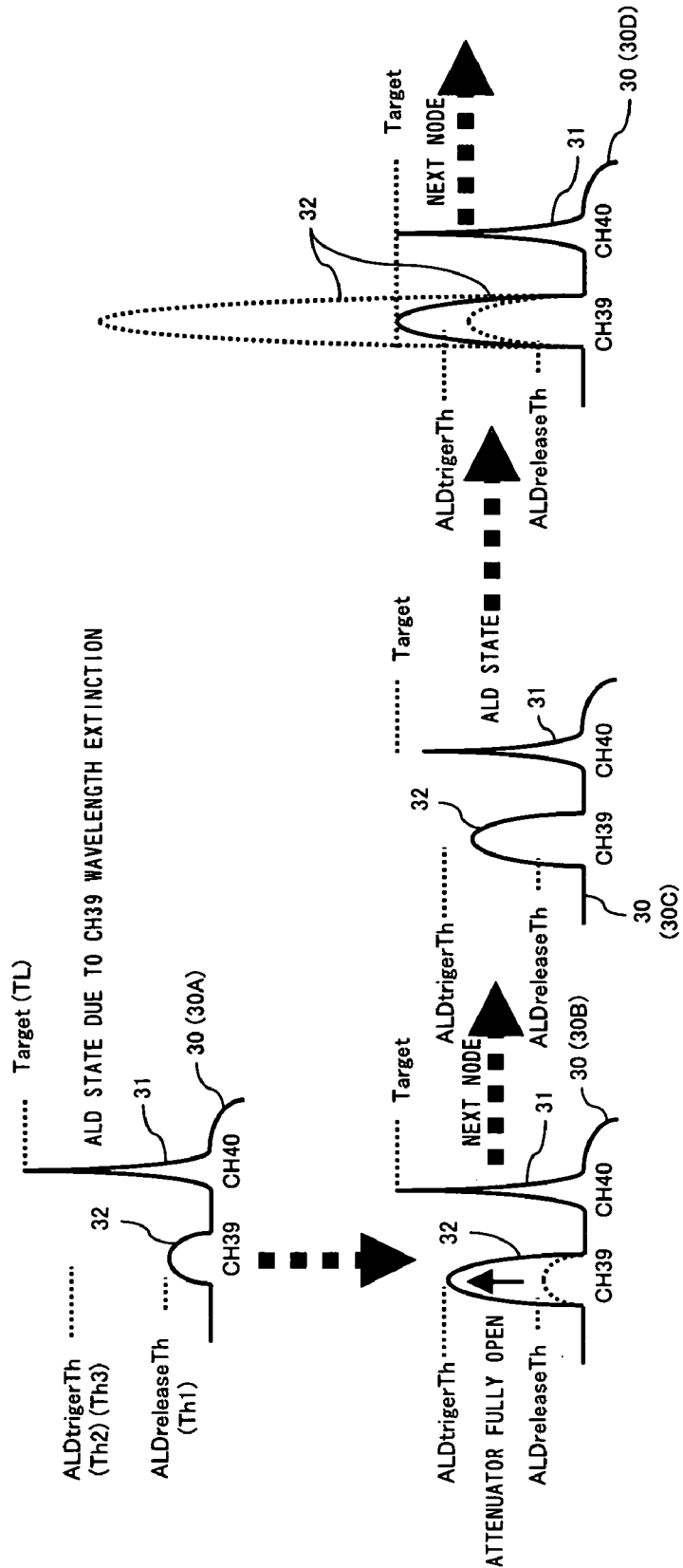
FIG. 10 describes an example operation of an optical add/drop multiplexer according to an embodiment of the present invention, and the effect of the control method therefor in view of the technical problem of the conventional technique.

FIG. 10 describes an example operation of an optical add/drop multiplexer and a control method therefor according to the present embodiment.

As exemplified by FIG. 7, a WDM telecommunication system 300 according to the present embodiment includes an optical transmission path 301, an optical transmission path 302, a network repeater 303 and an optical add/drop multiplexer 100.

The optical transmission path 301 and optical transmission path 302 each comprise an optical medium such as an optical fiber for transmitting a wavelength multiplexed light 30 in mutually opposite directions.

A plurality of optical add/drop multiplexers 100 are installed within the optical transmission paths 301 and 302 to implement an telecommunications between network repeaters 303 by way of a wavelength multiplexed light 30 by adding and dropping a signal light 31 therefor.

The following description is of an example comprisal of the optical add/drop multiplexer 100 according to the present embodiment in reference to FIG. 3.

The optical add/drop multiplexer 100 according to the present embodiment connected to a pair of the optical transmission path 301 and the optical transmission path 302 with mutually opposite transmission directions, extracts a signal light 31 from the wavelength multiplexed light 30 which is transmitted through each of the aforementioned optical transmission paths 301 and 302, and adds a signal light 31 to the wavelength multiplexed light 30.

As the processing for each of the optical transmission paths 301 and 302 is mutually equivalent with the exception of their transmission directions being opposite, the following description focuses on the configuration related to the optical transmission path 301.

The optical add/drop multiplexer 100 according to the present embodiment includes a wavelength add unit 110, a wavelength add unit 120, an amplifier unit 130, an amplifier unit 140, an optical management unit 150, an optical management unit 160, a wavelength drop unit 170, a wavelength drop unit 180 and a control board 190.

A wavelength multiplexed light 30 coming from the optical transmission path 301 passes through the amplifier unit 130, wavelength add unit 110 and amplifier unit 140.

A wavelength multiplexed light 30 coming from the optical transmission path 302 passes through the amplifier unit 140, wavelength add unit 120 and amplifier unit 130.

The wavelength add unit 110 includes a wavelength add/pass-through unit 111, an optical power monitor unit 112, an optical power control unit 113, an add port 114, a pass-through input port 115 and a pass-through output port 116.

The wavelength add/pass-through unit 111 inserts a signal light 31 from the add port 114 to a pass-through wavelength multiplexed light 30 on an as required basis.

The optical power monitor unit 112 comprises a spectrum analyzer for example, and measures an optical power of each signal light 31 included in the wavelength multiplexed light 30 which is output from the wavelength add/pass-through unit 111 to input to the optical power control unit 113 as an optical power signal 40.

The optical power control unit 113 controls the wavelength add/pass-through unit 111 by inputting an optical attenuation control signal 41 thereto based on the optical power signal 40.

As exemplified by FIG. 4, the wavelength add/pass-through unit 111 includes an optical branching filter 111a, an optical multiplexer 111b, optical switches 111c, optical attenuators 111d and a switch control unit 111f.

The optical branching filter 111a makes a plurality of signal lights 31 with different wavelengths branch to different optical paths from the wavelength multiplexed light 30 input to the pass-through input port 115. The following description refers to a communication path corresponding to each wavelength (i.e., signal light 31) as a channel where necessary.

The optical multiplexer 111b multiplexes a plurality of signal lights with different wavelengths into one wavelength multiplexed light 30 to output to the pass-through output port 116.

The optical switches 111c and optical attenuators 111d are placed in the optical paths of the individual signal lights 31 between the optical branching filter 111a and the optical multiplexer 111b.

The optical switch 111c adds an input signal light 31 to the add port 114 for the corresponding channel.

The optical attenuator 111d controls an optical power (i.e., an intensity of light) by making an optical path of a pass-through signal light 31 change between a fully open to a fully closed.

The switch control unit 111f controls the optical switches 111c and optical attenuators 111d based on an external instruction.

The present embodiment is configured to control an attenuation of a signal light 31 at each of the optical attenuators 111*d* based on an optical attenuation control signal 41 input from the optical power control unit 113 for instance.

The optical power control unit 113 according to the present embodiment is constituted by a computer 10 as exemplified by FIG. 5 for example.

The computer 10 includes a processor 11, a memory 12, and an input/output interface 13.

The processor 11, comprising a DSP (digital signal processor), et cetera for example, executes a program stored by the memory 12, thereby performing various controls as described later.

The memory 12 retains an optical power control program 14 executed by the processor 11 and further an optical power control table 15.

The optical power control program 14 is executed by the processor 11, thereby implementing a later described first control mode 14A and second control mode 14B for each channel.

The input/output interface 13 controls an input and output of information between the computer 10 (i.e., the optical power control unit 113) and external entities.

The present embodiment is configured to input and output the optical power signal 40, optical attenuation control signal 41, wavelength state notification signal 42, channel control signal 201, et cetera.

The wavelength state notification signal 42 is information received from the optical power control unit 113 of another optical add/drop multiplexer 100 by way of the optical management unit 150 and includes information such as a wavelength configuration signal WCS, a wavelength condition information WCF, et cetera.

The optical power control unit 113 of the wavelength add unit 110 which adds a discretionary signal light 31 transmits a wavelength state notification signal 42 (i.e., a wavelength configuration signal WCS and a wavelength condition information WCF) relating to the aforementioned inserted signal light 31 to the wavelength add unit 110 (i.e., the optical power control unit 113) of an optical add/drop multiplexer 100 on the downstream side of the optical transmission path 301 by way of the optical management unit 160.

The wavelength add unit 110 (i.e., the optical power control unit 113) of an optical add/drop multiplexer 100, through which the signal light 31 inserted by another optical add/drop multiplexer 100 passes-through, controls a later described optical power based on the wavelength state notification signal 42 transmitted from the wavelength add unit 110 (i.e., the optical power control unit 113) of the optical add/drop multiplexer 100 on the upstream side, which inserted the aforementioned signal light 31, by way of the optical management unit 150.

The channel control signal 201 includes instruction information such as add, pass-through, drop, et cetera, of a signal light 31 and instruction information of a setup change of a shutdown state, which are given to each optical add/drop multiplexer 100 from an external control terminal 200 by way of the control board 190.

As exemplified by FIG. 6, the optical power control table 15 according to the present embodiment is configured to allow information such as channel name 15*a*, channel attribute 15*b*, control status 15*c*, wavelength configuration information 15*d*, channel state 15*e* and shutdown control information 15*f* to be set up for each channel name 15*a*.

The channel name 15*a* is an identifier name given to channels corresponding to wavelengths of a plurality of signal lights 31.

The channel attribute 15*b* is set up with information for the purpose of identifying whether a signal light 31 identified by each channel name 15*a* is inserted by the apparatus itself or passes-through the apparatus (i.e., is dropped by the apparatus) after being inserted by another optical add/drop multiplexer 100.

That is, to set up with "A" (i.e., add) if the aforementioned signal light 31 is inserted by the apparatus itself, or set up with "T" (i.e., pass-through) if it passes through the apparatus itself.

And the aforementioned channel decides which mode to operate in, i.e., the first control mode 14A or the second control mode 14B, according to the setup state of the channel attribute 15*b*.

If there is a mixture of a plurality of channels with different attributes, the computer 10 executes the optical power control program 14 as multi-tasking, thereby carrying out the first and second control modes 14A and 14B in parallel for each channel.

The wavelength configuration information 15*d* is set for identifying whether a signal light specified by the relevant channel name 15*a* is in a Channel In Service (IS) or a Channel Out Of Service (OOS) state.

A Channel In Service (Channel IS) state corresponds to the wavelength configuration signal WCS=0, while a Channel Out of Service (Channel OOS) state corresponds to the wavelength configuration signal WCS=1.

The channel state 15*e* is set up with information for indicating whether or not a failure has occurred due to any causes relating to a signal light 31 in service (i.e., the wavelength configuration signal WCS=1).

That is, if there is a failure in the relevant channel (i.e., the signal light 31), the wavelength condition information WCF=1 is set, while if there is no failure, the wavelength condition information WCF=0 is set.

The shutdown control information 15*f* is set up with information for instructing a transition of state to, or separation from, a later described shutdown state 22.

A setup of the shutdown control information 15*f* can be performed by the control terminal 200 by way of the channel control signal 201 or by an optical add/drop multiplexer 100 on the upstream side by way of a control signal light 162.

The optical power control unit 113 (i.e., the computer 10) controls an optical power for each channel based on information set up in the optical power control table 15.

The wavelength add unit 120 includes a wavelength add/pass-through unit 121, an optical monitor unit 122, an optical power control unit 123, an add port 124, a pass-through input port 125 and a pass-through output port 126.

The configuration of each unit of the wavelength add unit 120 is the same as that of the above described wavelength add unit 110 and therefore its description is omitted here.

The amplifier unit 130 includes a pre-amplifier unit 131, an optical branching coupler 132, an optical branching coupler 133, a post-amplifier unit 134 and an optical combining coupler 135.

The pre-amplifier unit 131, being constituted by an optical amplifier such as an EDFA for example, amplifies a wavelength multiplexed light 30, in the form of the light as is, which is input to the wavelength add unit 110 from the optical transmission path 301.

The optical branching coupler 132 splits the control signal light 162 included in the wavelength multiplexed light 30 input to the pre-amplifier unit 131 and leads it to the optical management unit 150.

The optical branching coupler 133 splits a part of the wavelength multiplexed light 30 from the pre-amplifier unit 131 leading a part of it to the wavelength add/pass-through unit 111 and the other part to the wavelength drop unit 170.

The post-amplifier unit 134, being constituted by an optical amplifier such as an EDFA for example, amplifies the wavelength multiplexed light 30 coming from the wavelength add/pass-through unit 121 in the form of the light as is and outputs it to the optical transmission path 302.

The optical combining coupler 135, multiplexes by combining a control signal light 152 output from the optical management unit 150 to the wavelength multiplexed light 30 output from the post-amplifier unit 134.

The amplifier unit 140 includes a pre-amplifier unit 141, an optical branching coupler 142, an optical branching coupler 143, a post-amplifier unit 144 and an optical combining coupler 145.

The pre-amplifier unit 141, being constituted by an optical amplifier such as an EDFA for example, amplifies a wavelength multiplexed light 30, in the form of the light as is, which is input to the wavelength add unit 120 from the optical transmission path 302.

The optical branching coupler 142 splits a control signal light 152 included in a wavelength multiplexed light 30 input to the pre-amplifier unit 141 and leads it to the optical management unit 160.

The optical branching coupler 143 splits a part of the wavelength multiplexed light 30 from the pre-amplifier unit 141 leading a part of it to the wavelength add/pass-through unit 121 and the other part to the wavelength drop unit 180.

The post-amplifier unit 144, being constituted by an optical amplifier such as an EDFA for example, amplifies a wavelength multiplexed light 30, in the form of the light as is, coming from the wavelength add/pass-through unit 111 and outputs it to the optical transmission path 301.

The optical combining coupler 145, multiplexes by combining a control signal light 162 output from the optical management unit 160 with a wavelength multiplexed light 30 output from the post-amplifier unit 144.

The optical management unit 150 includes a control unit 151 which transmits a control signal light 152 to the optical management unit 160 equipped in the adjacent optical add/drop multiplexer 100, thereby sending information such as the above described wavelength state notification signal 42, et cetera.

The control unit 151 also receives information such as the above described wavelength state notification signal 42, et cetera, from an optical management unit 160 as a control signal light 162 coming from a later described optical management unit 160 by way of the optical transmission path 301.

The optical management unit 160 includes a control unit 161 which transmits a control signal light 162 to the optical management unit 160 equipped in the adjacent optical add/drop multiplexer 100 by way of the optical transmission path 301, thereby sending information such as the above described wavelength state notification signal 42, et cetera.

The control unit 161 also receives information such as the above described wavelength state notification signal 42, et cetera, from the above described optical management unit 150 by a control signal light 152 coming from the aforementioned optical management unit 150 by way of the optical transmission path 302.

The wavelength drop unit 170 includes a wavelength drop unit 171 and drop ports 172. The wavelength drop unit 171 extracts a signal light 31 of a discretionary wavelength from a wavelength multiplexed light 30 split by the optical branching coupler 133 and outputs it to one of the drop ports 172.

Likewise, the wavelength drop unit 180 includes a wavelength drop unit 181 and drop ports 182. The wavelength drop unit 181 extracts a signal light 31 of a discretionary wavelength from a wavelength multiplexed light 30 split by the optical branching coupler 143 and outputs it to one of the drop ports 182.

The control board 190 provides a control communication interface for controlling the above described respective units constituting the optical add/drop multiplexer 100 from an external control terminal 200.

The control terminal 200 comprised of a personal computer (PC), et cetera, inputs a channel control signal 201 to the wavelength add unit 110 and wavelength add unit 120 of the optical add/drop multiplexer 100, thereby setting up insert, add, and drop, et cetera.

The following description is of an example operation of the optical add/drop multiplexing method and optical add/drop multiplexer 100 according to the present embodiment.

The present embodiment is configured in such a manner that a control method for an optical power signal of a signal light 31 in each optical add/drop multiplexer 100 is different depending on whether the apparatus itself adds the aforementioned signal light 31 or a signal light 31 is added to a wavelength multiplexed light 30 by another optical add/drop multiplexer 100 passes-through on the upstream side, for each signal light 31 (i.e., wavelength: channel) operated by multiplexing to the wavelength multiplexed light 30.

That is, as exemplified by the flow chart shown in FIG. 1, each optical add/drop multiplexer 100 waits for an instruction from a control terminal 200 for an operation start for a new signal light 31 by using a empty wavelength band within the wavelength range of the wavelength multiplexed light 30 (step 401).

If there is an instruction for an operation start, the optical add/drop multiplexer 100 judges whether or not an insertion of a signal light 31 in the apparatus itself is requested (step 402).

If an insertion of a signal light 31 in the apparatus itself is requested, the first control mode 14A is selected, as exemplified by FIG. 2A (step 403), and an "A" is set for a channel attribute 15b of a corresponding channel name 15a of the optical power control table 15. The following description denotes the optical add/drop multiplexer 100 adding the signal light 31 as the add apparatus on an as required basis.

With regard to the same signal light 31, other optical add/drop multiplexers 100 (i.e., other than the inserting apparatus itself; referred to as "pass-through apparatus" hereinafter), through which the aforementioned signal light passes, set a "T" for a channel attribute 15b in the optical power control table 15 of the pass-through apparatus.

Moreover, the second control mode 14B is selected as an optical power control method (step 404) as exemplified by FIG. 2B.

As such, one add apparatus (i.e., an optical add/drop multiplexer 100) and the other pass-through apparatuses (i.e., optical add/drop multiplexers 100) are determined for each of a plurality of signal lights 31 included in the wavelength multiplexed light 30, and an attribute corresponding to a channel attribute 15b of the optical power control table 15 is set up in each of the optical add/drop multiplexers 100.

In the example of an optical transmission path 301 shown by FIG. 3, the following description denotes, relating to a certain signal light 31, the apparatus A as the add apparatus on the add path and the apparatus B as the pass-through apparatus on the pass-through path for the convenience of describing the respective operations.

As described above, the control methods for an optical power are different for an add apparatus and a pass-through apparatus according to the configuration of the present embodiment.

First, the apparatus A adds a signal light 31 (i.e., a WDM signal) to the add port 114 of the wavelength add/pass-through unit 111.

The wavelength add/pass-through unit 111 selects an input wavelength added by each of the add ports 114, performs a wavelength multiplexing with other signal lights 31 from the pass-through input port 115 and outputs from the pass-through output port 116 to the post-amplifier unit 144 at a subsequent stage as a wavelength multiplexed light 30 according to the wavelength configuration information 15*d* of the optical power control table 15. A part of the wavelength multiplexed light 30 is input to the optical power monitor unit 112.

The post-amplifier unit 144 applies an optical amplification to the wavelength multiplexed light 30 from the pass-through output port 116 in proportion to a transmission distance (i.e., a transmission loss) and outputs to the pre-amplifier unit 131 of the apparatus B by way of the optical transmission path 301.

The optical management unit 160 notifies the optical management unit 150 and optical power control unit 113, which are comprised by the apparatus B at a subsequent stage, of the wavelength configuration signal WCS and wavelength condition information WCF included in the wavelength state notification signal 42 which is obtained from the optical power control unit 113 by way of the control signal light 162.

The pre-amplifier unit 131 of the apparatus B applies an optical amplification to the incoming wavelength multiplexed light 30 in proportion to a transmission distance (i.e., a transmission loss) to the apparatus A on the optical transmission path 301 and outputs to the pass-through input port 115 of the wavelength add/pass-through unit 111.

The wavelength add/pass-through unit 111 of the apparatus B selects the wavelength multiplexed light 30 from the pass-through input port 115 and an input wavelength (i.e., a signal light 31) inserted by each of the add ports 114 according to the wavelength configuration signal WCS and wavelength condition information WCF which are notified from the side of the apparatus A by way of the control signal light 162, optical management unit 150 and wavelength state notification signal 42, applies a wavelength multiplexing and then outputs to the post-amplifier unit 144 at a subsequent stage by way of the pass-through output port 116.

A part of the wavelength multiplexed light 30 output to the pass-through output port 116 is input to the optical power monitor unit 112.

Here, each optical power signal of a plurality of signal lights 31 included in the wavelength multiplexed light 30 must be equal to a prescribed target level TL. This is because variation in an optical power level of each of the signal lights 31 causes unfavorable phenomena such as a crosstalk to occur.

Accordingly, the present embodiment is configured in a manner such that the optical power control unit 113 (i.e., the optical power control program 14 of the computer 10 in this case) controls a degree of attenuation of each of the optical attenuators 111*d* comprised by the wavelength add/pass-through unit 111 based on the optical power signal 40 of each signal light 31 detected by the optical power monitor unit 112, thereby carrying out an optical power control for adjusting the optical powers of a plurality of signal lights 31 included in the wavelength multiplexed light 30 to a target level TL in each wavelength add unit 110.

In the optical power control for the signal lights 31, the present embodiment is configured to control the cases of an add (path) apparatus and a pass-through (path) apparatus differently, as described above.

That is, in the case of the apparatus A adding a certain signal light 31 and the aforementioned signal light 31 passing-through through the apparatus B, the first control mode 14A is carried out in the apparatus A, while the second control mode 14B is carried out in the apparatus B, both for the aforementioned signal light 31.

In the case of the add path for adding a signal light 31, the optical power control program 14 executes the first control mode 14A shown by FIG. 2A.

First, the initial state at a power on of the optical add/drop multiplexer 100 is defined as a block state 21, which is the state of not carrying out an input wavelength selection or an optical power control.

Next, defined as a shutdown state 22 is period during the carrying out of an input wavelength selection, according to a setup of the wavelength configuration signal WCS (WCS=1: Channel In Service), which is set up by the user operating on the control terminal 200.

A completion of the input wavelength selection is followed by transiting to an auto level down state 23 (ALD) from the shutdown state 22 by an instruction (i.e., a Shutdown Release) from the control terminal 200.

The auto level down state 23 is one for making the optical attenuators 111*d* be half open and transitions to an auto level control state 24 (ALC) if the input power of the current signal light 31 is at a certain level (i.e., an ALD Release Level) or higher.

And in the auto level control state 24, the optical power control unit 113 performs the control of further opening the optical attenuators 111*d* gradually so that a signal light 31 of each wavelength band becomes an expected target level TL by a feedback control based on the optical power signal 40 obtained from the optical power monitor unit 112.

If the target level TL is not reached even though the optical attenuators 111*d* are further fully opened, the judgment is that it is of less than a predefined level (i.e., the second threshold value Th2; an ALD trigger level) and makes it transition to an auto level down state 23 and stand by.

The half open state of the optical attenuators 111*d* is a necessary requirement for judging a presence or absence of a light input because the optical power monitor unit 112 monitors a signal light 31 behind the optical attenuators 111*d* (i.e., on the pass-through output port 116 side).

Note that in the case of the user setting a transition instruction (i.e., a Shutdown) for a forced shutdown state 22 by way of the control terminal 200, it waits in a shutdown state 22, while in the case of setting a wavelength configuration signal WCS=0 (i.e., Channel OOS), it waits in a block state 21.

In the case of a pass-through path, the optical power control program 14 executes the second control mode 14B exemplified by FIG. 2B.

First, the initial state at the time of a power on is defined as a block state 21 in which neither an input wavelength selection nor an optical power control by the optical power control unit 113 is performed.

Next is to set a shutdown state 22 while carrying out an input wavelength selection according to information of a Channel IS by the user setting a wavelength configuration signal WCS=1.

A completion of an input wavelength selection is followed by setting a Shutdown Release from the control terminal 200. Then a possibility of a transition to an auto level control state 24 is judged according to a state of the wavelength configuration signal WCS (i.e., a Channel IS or a Channel OOS) and a state of Wavelength Channel Failure WCF (i.e., Wavelength Channel Fail or -Non Fail) as a notification from an add apparatus by way of the control unit 151 of the optical management unit 150.

That is, a transition occurs from the shutdown state 22 to auto level control state 24 (ALC) only in the case of the wavelength configuration signal WCS=1 (i.e., In Service) and also the wavelength condition information WCF=0 (i.e., Non Fail).

And in the auto level control state 24, the optical power control unit 113 performs the control for opening the optical attenuator 111d gradually so that a signal light 31 of each wavelength band assumes an expected target level TL by a feedback control based on the optical power signal 40 obtained from the optical power monitor unit 112.

If the target level TL is not reached even if the optical attenuator 111d is fully open, it is judged as being lower than a predefined level (i.e., the third threshold value Th3) (i.e., a Shutdown Trigger Level) and waits by transitioning to a shutdown state 22.

Incidentally, in the case of the user (i.e., the control terminal 200) setting a forced transition to a shutdown state 22 (i.e., Shutdown set), it waits in the shutdown state 22, while in the case of setting the wavelength configuration signal WCS=0 (i.e., a Channel OOS), it waits by transitioning to a block state 21.

As described above, the present embodiment is configured to make the optical attenuators 111d be in half open states and carry out a constant control of an output power while the optical power control unit 113 performs a feedback control of the optical power signal 40 by the first control mode 14A in the Add Path in which the apparatus itself has inserted a signal light 31.

In the Through Path of a signal light in which an ASE noise accumulates on the other hand, it waits in a shutdown state 22, and transitions to an auto level control state 24 from the shutdown state 22 only if the wavelength of a pass-through signal light 31 is truly valid based on a wavelength state notification signal 42, such as a wavelength configuration signal WCS and wavelength condition information WCF, by way of a control signal light 162 from an add apparatus at a previous stage, followed by the optical power control unit 113 carrying out a constant control of the output power of the pass-through light while performing a feedback control by using an optical power signal 40 by the second control mode 14B.

This makes it possible to securely avoid a constant control of output power based on an inappropriate wavelength due to an accumulation of the ASE noise.

And, if there is an abnormality in a control line such as an control signal light 162, et cetera, during an operation, an influence of the ASE noise is securely eliminated between optical add/drop multiplexers 100 without causing an influence such as an operating specification change, et cetera, on an existing operation line because a transition per se to a shutdown state 22 is the one performed based on an power level of the signal light 31, thereby accomplishing a long distance transmission in the WDM telecommunication system 300 including a plurality of optical add/drop multiplexers 100.

Meanwhile, since the first control mode 14A and the second control mode 14B can be implemented by software and firmware, there is no cost increase as a result of adding a new component, et cetera, to the optical add/drop multiplexer 100, which is described by referring to FIG. 10.

A conventional optical add/drop multiplexer 100 controls by the first control mode 14A, shown by FIG. 2A, regardless of whether a signal light 31 is an add light or a pass-through light.

As indicated by a signal wave form 30A, an add apparatus (path) judges a transition to an auto level control state 24 based on the first threshold value Th1 (ALD release level) at the time of an insertion start in preparation of drawing in an optical signal level at the time of the insertion start even in a state of a signal light 31 as the subject of an add (i.e., a channel CH39) not being input.

Because of this, if an ASE noise 32 exceeds the aforementioned first threshold value Th1, thus transitioning to an auto level control state 24, the optical power control unit 113 performs the control of fully opening the optical attenuator 111d.

The ASE noise 32 included in the wavelength multiplexed light 30 propagates, as is, to an optical add/drop multiplexer 100 of the next node and exceeds the first threshold value Th1, and therefore it transitions to an auto level control state 24 and fully opens the optical attenuator 111d as shown by a signal wave form 30C in the aforementioned optical add/drop multiplexer 100.

If this situation is repeated in an optical add/drop multiplexers 100 positioned at a subsequent stage, an ASE noise 32 in the channel (i.e., CH39) prior to a usage start is accumulated to become equal to the target level TL as shown by a signal wave form 30D.

Then, the aforementioned signal light is actually inserted to the channel (i.e., CH39) in an optical add/drop multiplexer 100 inserting a signal light 31 in the above described state, the inserted signal light 31 is not attenuated and assumes an abnormally large signal level exceeding the target level TL, as shown by a signal wave form 30D for example, at a pass-through apparatus on the downstream side because the optical attenuator 111d is fully open in the auto level control state 24.

As a result of this, the concern is that a transmission failure will be caused by the signal light 31 of an adjacent operating channel (i.e., CH40) disturbed by the influence of an abnormally large signal level of this channel (i.e., CH39).

In comparison with the above described, the present embodiment is configured to perform a control of the first control mode 14A in an add apparatus which adds a signal light 31, whereas the other pass-through apparatuses operate in the second control mode 14B and therefore do not transition to an auto level control state 24 to open an optical attenuator 111d unless a notification is received, such as a wavelength configuration signal WCS=1 and wavelength condition information WCF=0 from the add apparatus.

Because of this, even if an add apparatus transitions to an auto level control state 24 by the first control mode 14A at the time of an addition start, other pass-through apparatus on the downstream side stay in a shutdown state 22 and therefore an optical attenuator 111d of a channel as the subject of insertion is closed, thereby preventing an ASE noise 32 from accumulating and propagating to the pass-through apparatus side.

Then, following adding an actual signal light 31 to a channel, the add apparatus notifies the pass-through apparatus side, by way of an control signal light 162, of the information of the wavelength configuration signal WCS and wavelength condition information WCF, thereby making the pass-through apparatus transition to an auto level control state 24.

By so doing, the signal light 31 inserted by the add apparatus is controlled so as to stabilize it by gradually shifting it to a target level TL as a result of gradually opening the optical attenuators 111*d* by a feedback control of the optical power control unit 113 in the second control mode 14B in the pass-through apparatus.

This accordingly enables a definite prevention of a telecommunication failure such as a crosstalk due to a disturbed signal light 31 in the adjacent channel caused by the inserted signal light 31 exceeding the target level and becoming abnormally large.

An operation of the above described optical add/drop multiplexer 100 according to the present embodiment is described more concretely by referring to FIGS. 8 and 9.

Normal operation and that at a failure occurrence are described separately in the description of the operation in an Add Path of an add apparatus inserting a light and that in a Through Path of pass-through apparatuses at the next stage and thereafter.

Note that the description here is based on the assumption that the pass-through apparatus is already in an operational standby (i.e., from the power on to the state of wavelength setup complete) for simplification of the description.

As exemplified by FIG. 8, an add apparatus transitions to a block state 21 (i.e., an initial state) by turning the power on and also notifies a pass-through apparatus of a WCS=0 and WCF=0 at a normal operation (step 501).

In this event, the pass-through apparatus stands by in a block state 21 (step 601).

Then, the add apparatus transitions from the block state 21 to a shutdown state 22 by an operation of setting a wavelength configuration signal WCS=1 (i.e., a wavelength setup) in the wavelength configuration information 15*d* of the optical power control table 15 from the control terminal 200. It also notifies the pass-through apparatus of a WCS=1 and WCF=1 (step 502).

In this event, the pass-through apparatus transitions from the block state 21 to a shutdown state 22 as a result of being notified of the WCS=1 (step 602).

Then, the add apparatus transitions from the shutdown state 22 to an auto level down state 23 (i.e., a wavelength setup complete) and notifies the pass-through apparatus of the WCS=1, WCF=1 and "release" of the shutdown state 22 by the control terminal 200 setting a "release" in the shutdown control information 15*f* (step 503).

In this event, the pass-through apparatus stands by in the shutdown state 22 because it has not yet received wavelength condition information WCF=0 (step 603).

Then the add apparatus monitors an optical power signal 40 of a signal light 31 input from the add port 114; and transitions from the auto level down state 23 to an auto level control state 24 at the time of exceeding a predefined first threshold value Th1 (ALD release Th) and starts a constant output power control for making an output power of the signal light 31 inserted by the add port 114 identify with a target level TL. And at the same time notifying the pass-through apparatus of a WCS=1 and WCF=0 (step 504).

Having received the above described notification, the optical power control unit 113 on the pass-through apparatus side transitions from the shutdown state 22 to an auto level control state 24 since the conditions of the shutdown control information 15*f*="release", WCS=1 and WCF=0.

And carries out a constant output power control for making an output power of the pass-through light (i.e., a signal light 31) coming from the add apparatus side identify with the target level TL by a feedback control based on the optical power signal 40 from the optical power monitor unit 112 (step 604).

Note that the pass apparatus side transitions from the auto level control state 24 to a shutdown state 22 at the time of the optical power signal 40 of a signal light 31 (i.e., a pass-through light) becoming lower than a predefined third threshold value Th3 (which is the same as the second threshold value Th2 in the present embodiment), or that of the control terminal 200 setting a "set" in the shutdown control information 15*f*.

If an abnormality, such as an interruption of a signal light 31 (i.e., an inserted light) for instance, occurs in such a normal operating condition, the following operation is performed as shown by FIG. 9.

That is, as the above described step 504, the add apparatus transitions from the auto level down state 23 to an auto level control state 24 to carry out an constant output power control of the signal light 31 (i.e., the inserted light) and also notifies the pass apparatus of the WCS=1 and WCF=0.

By so doing, as in the above described step 603, the pass-through apparatus, transitions from the shutdown state 22 to an auto level control state 24, and carries out a constant control of output power.

If an optical interruption of the signal light 31 (i.e., the inserted light) occurs at the add port 114 of the inserting apparatus, the aforementioned add apparatus transitions from the auto level control state 24 to an auto level down state 23 at the time of the optical power signal 40 becoming lower than the second threshold value Th2 and also notifies the pass-through apparatus of the WCS=1 and WCF=1 (step 505).

In this event, the pass-through apparatus side transitions from the auto level control state 24 to a shutdown state 22 at the time of detecting the signal light 31 (i.e., the pass-through light) becoming lower than the third threshold value Th3. The optical attenuators 111*d* are closed in the shutdown state 22, hence being in a state of shutting off propagation of an ASE noise (step 605).

As described above, a transition from the auto level control state 24 to shutdown state 22 is automatically performed based on a decrease of the optical power (i.e., the optical power signal 40) of a pass-through light while information of a wavelength configuration signal WCS or wavelength condition information WCF is not used as a trigger for a transition to the shutdown state 22 in the pass-through apparatus (i.e., the second control mode 14B).

Then, as the light interruption of the signal light 31 (i.e., the inserted light) at the add port 114 is recovered, the add apparatus side transitions from the auto level down state 23 to an auto level control state 24 to carry out a constant control of output power by the comparison of the first threshold value Th1 and the optical power signal 40, and also notifies the pass-through apparatus of the WCS=1 and WCF=0 (step 506).

Having received this, the pass-through apparatus transitions from the shutdown state 22 to an auto level control state 24 and resumes a constant control of output power of the signal light 31 (i.e., the pass-through light) based on the condition of the WCS=1 and WCF=0 notified by the add apparatus (step 606).

As described above, a transition to the auto level control state 24 in the pass-through apparatus is performed based on information of a wavelength configuration signal WCS and wavelength condition information WCF, the pass-through apparatus standing by in the shutdown state 22 if the optical power is equal to or less than a predefined level.

As such, the present embodiment is configured in such a manner that a pass-through (path) apparatus, other than an add (path) apparatus operating in the first control mode 14A, operates in the second control mode 14B not only at the time of operation start of an inserted light as exemplified by the flow chart shown by FIG. 8 but also at the times of occurrence of, and recovery from, a failure of an operating light as exemplified by FIG. 9, thereby preventing a propagation and accumulation of an ASE noise from an add apparatus to a pass-through apparatus in each channel.

This configuration prevents an occurrence of a malfunction such as an optical power of a signal light 31 (i.e., an inserted light) greatly exceeding a target level TL, which is caused by a propagation and accumulation of an ASE noise 32 from the add apparatus to pass-through apparatus.

This enables a definite prevention of a data failure such as a crosstalk as a result of an optical power of a signal light 31 of a specific channel (i.e., a wavelength) becoming abnormally large and influencing a signal light 31 of the adjacent channel.

Note that the present invention can be variously changed within the scope thereof and is not limited by the configurations exemplified by the above described embodiments.

The present invention enables definite prevention of a data failure due to an ASE noise, et cetera, at the time of a wavelength addition without a cost increase of an additional component in an optical telecommunication system including a plurality of optical add/drop multiplexers.

Also enabled is an implementation of a long distance telecommunications by a multiple stage connection of a discretionary number of optical add/drop multiplexers without causing a limitation of the number of connecting stages thereof in an optical telecommunication system including a plurality of optical add/drop multiplexers.

Also enabled is a removal, in the units of wavelength, of a multiple stage accumulation of an ASE noise occurring in optical amplifiers in an optical telecommunication system including a plurality of optical add/drop multiplexers.

What is claimed is:

1. An optical add/drop multiplexer including:
    an optical switch unit for performing an optical add/drop multiplexing for a wavelength multiplexed light;
    an optical power control unit for performing a control of an optical power by the unit of each signal light included in the wavelength multiplexed light; and
    a control information communication unit for transmitting and receiving control information with another apparatus, wherein
    the optical power control unit includes control logic for implementing
    a plurality of control modes includes a first control mode and a second mode,
    the first control mode in which a transition to an automatic control of the optical power and release therefrom are carried out by comparing the optical power with a threshold value, and
    the second control mode in which a transition to an automatic control of the optical power is carried out based on control information as a notification by another of the optical add/drop multiplexers by way of the control information communication unit and release from the automatic control is carried out based on the comparison between the optical power and the threshold value, wherein
    said first control mode includes a block state at the time of turning a power on, a shutdown state at the time of recognizing a usage start of said inserted light, an auto level down state for the purpose of judging whether or not to transition to automatic control of an optical power of the inserted light, and an automatic level control state for making an optical power of the inserted light identify with a target level by the automatic control, and
    said second control mode includes a block state at the time of turning a power on, a shutdown state at the time of recognizing a usage start of said pass-through light, and an automatic level control state for making an optical power of the pass-through light identify with a target level by an automatic control.

2. The optical add/drop multiplexer according to claim 1, wherein
    said first control mode is used if said inserted light is the one inserted by the inserting apparatus, and
    said second control mode is used if the signal light is a pass-through light coming from the outside.

3. The optical add/drop multiplexer according to claim 1, wherein
    a transition from the shutdown state to the auto level down state and a reversion of the aforementioned transition are carried out by an instruction for releasing a shutdown and setting a shutdown, both from the outside, and
    a transition from the auto level down state to the automatic level control state and a reversion of the aforementioned transition are carried out based on whether or not an optical power of the inserted light exceeds a first threshold value and whether or not the optical power is less than a second threshold value.

4. The optical add/drop multiplexer according to claim 1, wherein
    a transition from the shutdown state to the automatic level control state is carried out based on control information as a notification from another of the optical add/drop multiplexers by way of said control information communication unit and release from the automatic level control state is carried out by the comparison between the optical power and a threshold value.

5. The optical add/drop multiplexer according to claim 1, further including
    an optical attenuation unit for adjusting an optical power of each of said signal lights and an optical power observation unit for detecting an optical power of each of the signal lights, wherein
    said automatic control is a feedback control for controlling the optical attenuation unit based on the optical power obtained from the optical power observation unit.

6. A control method for an optical add/drop multiplexer for carrying out an optical add/drop multiplexing of an signal light for a wavelength multiplexed light, comprising:
    judging whether the signal light as the subject of control is light inserted in the inserting apparatus or a pass-through light coming from an external entity, and
    carrying out a plurality of control modes includes a first control mode and a second control mode, wherein
    the first control mode in which a transition to an automatic control of the optical power and release from the aforementioned control are carried out by comparing the optical power with a threshold value, if the signal light is the inserted light, while the second control mode in which a transition to an automatic control of the optical power of the pass-through light is carried out based on control information as a notification by another of the optical add/drop multiplexers and release from the automatic control is carried out based on the comparison between the optical power and the threshold value, wherein
    said first control mode includes a block state at the time of turning a power on, a shutdown state at the time of recognizing a usage start of said inserted light, an auto level down state for the purpose of judging whether or not to transition to automatic control of an optical power of the inserted light, and an automatic level control state for making an optical power of the inserted light identify with a target level by the automatic control, and said second control mode includes a block state at the time of turning a power on, a shutdown state at the time of recognizing a usage start of said pass-through light, and an automatic level control state for making an optical power of the inserted light identify with a target level by an automatic control.

7. The control method for an optical add/drop multiplexer according to claim 6, wherein a transition from the shutdown state to the auto level down state and a reversion of the aforementioned transition are carried out by an instruction for releasing a shutdown and setting a shutdown, both from the outside, and a transition from the auto level down state to the automatic level control state and a reversion of the aforementioned transition are carried out based on whether or not an optical power of the inserted light exceeds a first threshold value and whether or not the optical power less than a second threshold value.

8. The control method for an optical add/drop multiplexer according to claim 6, wherein a transition from the shutdown state to the automatic level control state is carried out based on control information as a notification from another of the optical add/drop multiplexers and release from the automatic level control state is carried out by the comparison between the optical power and a threshold value.

9. The control method for an optical add/drop multiplexer according to claim 6, wherein an automatic control of said optical power is a feedback control for making an attenuation change based on an observation result of the aforementioned optical power.

10. A computer readable medium encoded with a control program for an optical add/drop multiplexer that carries out an optical add/drop multiplexing of an signal light for a wavelength multiplexed light, when execute causes a computer constituting the optical add/drop multiplexer perform the functions of judging whether the signal light as the subject of control is inserted light in the inserting apparatus or a pass-through light coming from an externally entity, and carrying out a plurality of control modes includes a first control mode and a second control mode, wherein the first control mode in which a transition to an automatic control of the optical power of the signal light and release from the aforementioned control are carried out by comparing the optical power with a threshold value, and the second control mode in which a transition to an automatic control of the optical power of the signal light is carried out based on control information as a notification by another of the optical add/drop multiplexers by way of the control information communication unit and release from the automatic control is carried out based on the comparison between the optical power and the threshold value, wherein said first control mode is carried out if said signal light is inserted light in the inserting apparatus and includes a block state at the time of turning a power on, a shutdown state at the time of recognizing a usage start of said inserted light, an auto level down state for the purpose of judging whether or not to transition to automatic control of an optical power of the inserted light, and an automatic level control state for making an optical power of the inserted light identify with a target level by the automatic control, and said second control mode is carried out if said signal light is a pass-through light coming from an external entity, and includes a block state at the time of turning a power on, a shutdown state at the time of recognizing a usage start of said pass-through light, and an automatic level control state for making an optical power of the inserted light identify with a target level by an automatic control.

11. The computer readable medium encoded with a control program for an optical add/drop multiplexer according to claim 10, wherein a transition from the shutdown state to the auto level down state and a reversion of the aforementioned transition are carried out by an instruction for releasing a shutdown and setting a shutdown, both from the outside, and a transition from the auto level down state to the automatic level control state and a reversion of the aforementioned transition are carried out based on whether or not an optical power of the inserted light exceeds a first threshold value and whether or not the optical power is less than a second threshold value.

12. The computer readable medium encoded with a control program for an optical add/drop multiplexer according to claim 10, wherein a transition from the shutdown state to the automatic level control state is carried out based on control information as a notification from another of the optical add/drop multiplexers and release from the automatic level control state is carried out by the comparison between the optical power and a threshold value.

13. The computer readable medium encoded with a control program for an optical add/drop multiplexer according to claim 10, wherein said automatic control is a feedback control for controlling an attenuation of said optical power according to an observation result of the aforementioned optical power.

* * * * *